Figure 1:
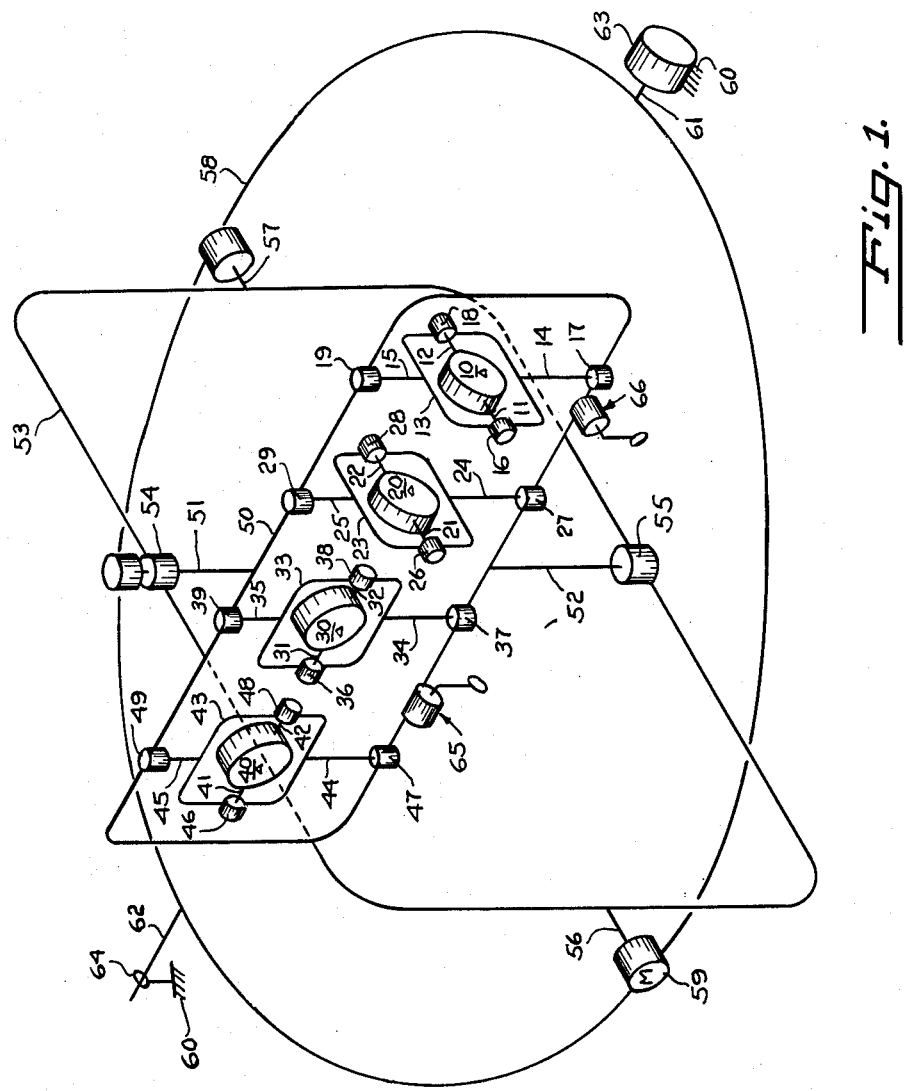

Aug. 11, 1964  P. W. CHAPMAN  3,143,892
INERTIAL PLATFORM
Filed March 12, 1958  3 Sheets-Sheet 1

INVENTOR.
PHILIP W. CHAPMAN
BY
Raymond A. Paquin
ATTORNEY.

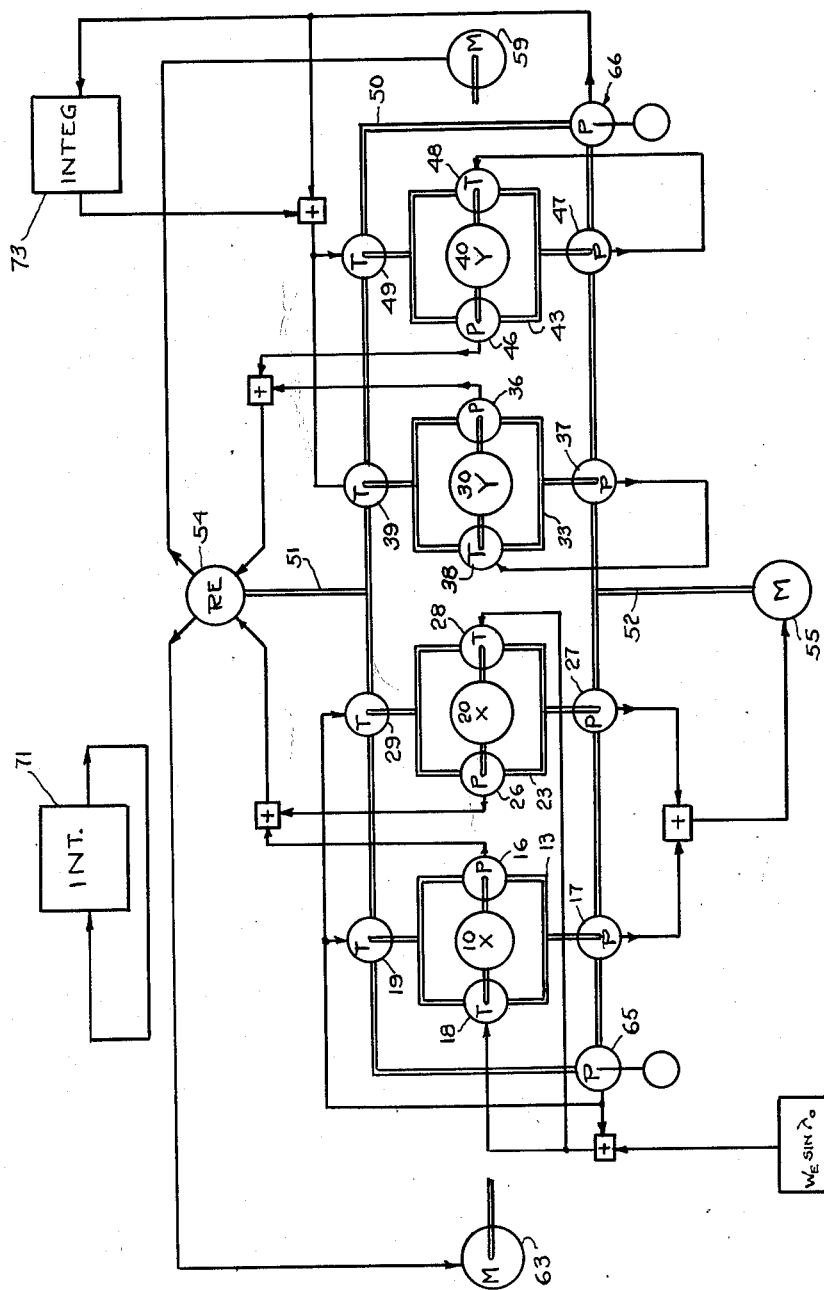

3,143,892
INERTIAL PLATFORM

Philip W. Chapman, Massapequa, N.Y., assignor to American Bosch Arma Corporation, a corporation of New York
Filed Mar. 12, 1958, Ser. No. 721,040
5 Claims. (Cl. 74—5.34)

The present invention relates to inertial navigation systems and has particular reference to an improved inertial platform therefor.

Inertial navigation systems are normally instrumented on the basis of an inertial coordinate system that is defined in space by the angular orientation of two or three gyroscopes. It is obvious that the accuracy of an inertial navigation system is dependent to a large degree on the performance of the gyros. In a general way gyro performance can be discussed in terms of gyro drifts or drift rates and, furthermore, these drifts or drift rates can be divided into constant, random, and non-random components. Therefore, it follows that an inertial navigation system's performance can be improved by reducing these components of gyro drift.

It is common practice to enhance system performance by compensating the individual gyros so as to remove or reduce the constant component of drift. This is quite easily accomplished since the required compensation is by definition a constant. It is somewhat more difficult to compensate a gyro so as to eliminate the non-random component of drift, since it is implied that these drifts are a function of torques that are dependent on the external environment. Techniques have been developed to eliminate these drifts for a wide variety of environmental conditions but the present day state of the art does not in general allow complete compensation for all possible environmental conditions, and under some conditions, such as vibration for example, there will be a non-random residual gyro drift. Random drifts of a single gyro are impossible to control.

The present invention seeks to improve the accuracy of the inertial navigation system by providing an inertial platform reference using parallel redundancy of gyros. The novel arrangement of the gyros in the inertial platform includes four two degree of freedom gyros with horizontal spin axes mounted on the inertial platform in two pairs of two gyros each. The spin axes of the two gyros in each pair are parallel to each other but have opposite senses of rotation. The gyro spin axes of one pair are perpendicular to the gyro spin axes of the other pair.

The platform is slaved to the gyros with a high degree of accuracy and thus physically establishes the rectangular coordinate system. The slaving is accomplished by applying the sum of the appropriate gyro pick-off signals to the proper platform servo so as to null out the algebraic sum of the signals. Since the individual gyros have two degrees of freedom with respect to their own support it is necessary to provide means of slaving the gyros to each other for purposes of initial alignment and to minimize the effects of gyro drift during the navigation mode. The gyro slaving is accomplished by subtracting the signal of each gyro pick-off from the algebraic sum of the appropriate gyro pick-offs and applying the difference signal to that gyro's torquing device. This causes each gyro to precess towards the mean space position of the various gyros. Schuler tuning which tends to reduce the deleterious effect of gyro drift about a horizontal axis is used to maintain the gyro spin axes substantially horizontal but, since Schuler loop feedback cannot be applied to the azimuth channel of an inertial navigation system, it is desirable to minimize gyro drift about the vertical axis by other means. The proposed gyro arrangement therefore provides four independent sources of azimuth information which are used for reducing the gyro error in azimuth. In the event of a gyro failure, the pick-off signal from that gyro may be eliminated from the appropriate summing circuit by a logic device. This isolates the overall system from the deleterious effects of a gyro failure and allows continuation of system operation. The proposed parallel redundancy of gyros provides a number of advantages. The most apparent advantage lies in the area of improved overall system reliability. Another important advantage that accrues from the proposed instrumentation lies in the area of improved overall system accuracy. However, the dependence of system accuracy upon gyro performance and the enhancement provided therein by parallel redundancy is not immediately obvious and will, therefore, be discussed below.

The residual gyro drift referred to earlier, and any other non-random drift will be eliminated by the symmetry of the proposed parallel redundant instrumentation. This follows from the assumption that non-random gyro drifts are dependent on the external environment. Since the gyros are all of the same design and are mounted symmetrically in close proximity to one another, there is a high probability that each gyro in a pair is disturbed by the same torque. However, since the directions of rotation for the two gyro rotors in a pair are opposite to one another, the gyro precessions or drifts are in opposite directions. The instantaneous positions of the two gyros are algebraically summed and the net effect on the system is zero.

Random drift cannot be eliminated by compensating an individual gyro since the required instantaneous compensation is unpredictable. The only compensation that can be made is on the basis of the most probable or mean drift, but this is simply the constant component of drift that was discussed above. Unfortunately, random gyro drift, which cannot normally be eliminated, has a significant effect on system performance. The Central Limit Theorem, used extensively in statistical analysis, states that if a population has a finite standard deviation ($\sigma_0$) and a mean ($M_0$), then the distribution of the sample means approaches a normal distribution with a standard deviation $$\left(\frac{\sigma_0}{\sqrt{n}}\right)$$

and a mean ($M_0$) as the sample size ($n$) increases. The standard deviation of the distribution of sample means will be reduced from the standard deviation of the population by a factor of $\sqrt{n}$, where $n$ is the number of independent samples. No immediate conclusions can be drawn concerning the number of independent samples that are available from each gyro, since this is a complicated function of the system's filter characteristics and the autocorrelation function of the gyro drift. However, it is obvious that if the data from four different gyros, each of which has the same drift distribution is continuously added there will be four times as many independent samples as are available from one gyro. Therefore, the overall system will see a distribution of sample means that is normal and has a standard deviation of $$\frac{\sigma_0}{\sqrt{4n}}$$

Thus the standard deviation of system errors due to random gyro drifts will be reduced by a factor of two by the proposed instrumentation. It will be seen that the proposed parallel redundancy of gyros provides the following advantages over present day inertial platforms.

(a) Improvement of overall gyro reliability by an order of magnitude.

(b) Isolation of the system from the effects of non-random drifts, and (c) Reduction of the effects of random drifts by a factor of two.

Figure 2:
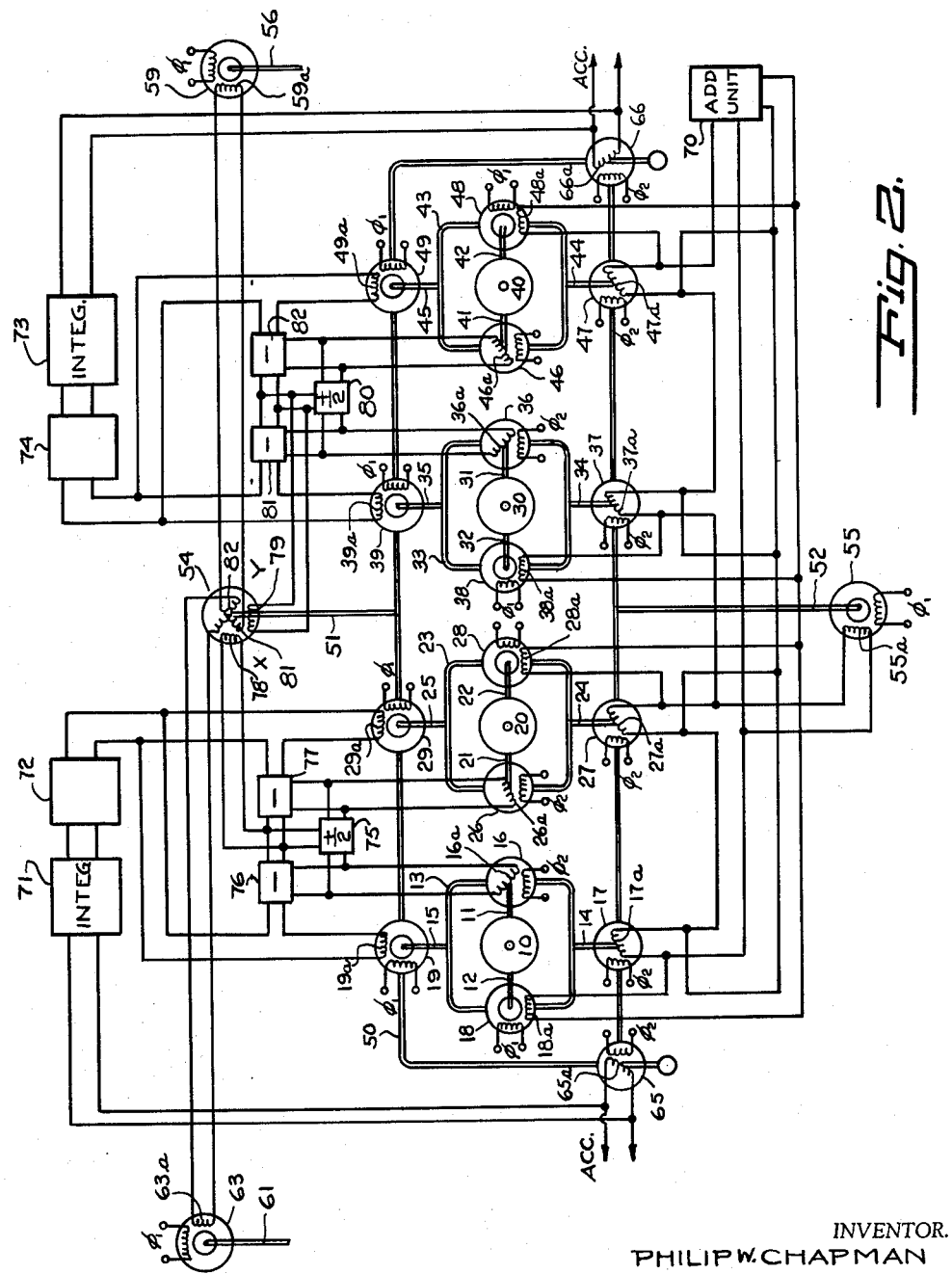

For a more complete understanding of the invention, reference may be had to the accompanying diagrams, in which FIG. 1 illustrates the mechanical structure of a preferred embodiment of the invention;

FIG. 2 is a schematic wiring diagram of the apparatus of FIG. 1, in the navigation mode; and FIG. 3 is a schematic wiring diagram of the apparatus of FIG. 1, in the alignment or pre-navigation mode.

A particular type of inertial navigation apparatus is fully described in the copending U.S. patent application Serial No. 358,753, filed June 1, 1953, by Joseph Statsinger, now Patent No. 3,023,617, for "Navigation System," and assigned to the assignee of this application. In the apparatus there described the inertial platform is maintained horizontal but is allowed to rotate about its vertical axis at a rate equal and opposite to the local vertical component of the rotation of the platform about the earth's polar axis. The outputs of a pair of accelerometers carried by the platform are integrated and the integrated values are applied to a navigation computer for determination of information related to present position and motion. The instant invention may be applied to a platform of the same general nature to carry a pair of accelerometers which are used as in the patent application referred to above. The platform is initially aligned with two of its three rectangular axes horizontal, along and perpendicular to the meridian at the initial position, and the third axis vertical. If the initially horizontal axes are maintained horizontal at all times, the platform will rotate about the vertical axis at its natural rate.

Although the invention herein described is particularly applicable to the control of an inertial platform this particular application should not be considered as limiting and the redundant gyros may be used wherever improved accuracy or reliability is required.

Referring now to FIG. 1 of the drawings, the inertial frame 50 is shown supporting the four horizontal spin axis gyroscopes 10, 20, 30, 40 for universal rotation therein. Thus, the gyro 10 is supported by horizontal shafts 11, 12 in the vertical frame 13 while the vertical shafts 14, 15 support the vertical frame 13 within the inertial frame 50. The shafts 11, 14 are operatively connected to the pickoff devices 16 and 17 respectively, while shafts 12 and 15 are operatively connected to the torquing devices 18 and 19 respectively.

Similarly the gyroscope 20 is supported by horizontal shafts 21, 22 in the vertical frame 23 while the vertical shafts 24, 25 support the frame 23 in the frame 50. Shafts 21 and 24 are operatively connected to the pickoff devices 26, 27 and shafts 22 and 25 are connected to the torquing devices 28 and 29. The spin axes of gyros 10, 20 are substantially parallel or colinear. Also, gyroscope 30 is supported by horizontal shafts 31, 32 in the vertical frame 33 which is, in turn, supported by vertical shafts 34, 35 within the frame 50.

Shafts 31 and 34 are operatively connected to the pickoff devices 36 and 37 while shafts 32 and 35 are operatively connected to the torquing devices 38 and 39. Finally, gyroscope 40 is supported by horizontal shafts 41 and 42 in the vertical frame 43 which is supported in frame 50 by the vertical shafts 44 and 45. Shafts 41 and 44 are operatively connected to the pickoff devices 46 and 47 while the shafts 42 and 45 are operatively connected to the torquing devices 48 and 49. The spin axes of gyros 30, 40 are substantially parallel to each other, and perpendicularly disposed to the spin axes of gyros 10, 20. The inertial frame 50 is universally suspended from the aircraft frame in the gimbal system including roll gimbal frame 53 and pitch gimbal ring 58. Thus, the inertial frame 50 is supported for rotation about the vertical axes by vertical shafts 51, 52 in the roll gimbal frame 53. Shaft 51 is operatively connected to resolver 54 and shaft 52 is operatively connected to the motor 55, the motor 55 and resolver 54 being carried by the gimbal frame 53. The gimbal frame 53 is supported by horizontal shafts 56, 57 in the pitch gimbal ring 58. Follow-up motor 59, which is carried by the gimbal ring 58, is operatively connected to the shaft 56. The gimbal ring 58 is suspended from the deck of the craft 60 by the horizontal shafts 61 and 62 one of which is journalled in a bearing 64 and the other of which is operatively connected to the follow-up motor 63.

The frame 50 carries the pendulum and pickoff devices 65, 66 which are mounted to have their sensitive axes in perpendicular directions.

FIG. 2 of the drawings shows in schematic form the electrical interconnections between the various electromechanical elements of FIG. 1 in the navigation mode. The pickoff devices are illustrated as rotary induction devices having an energized primary winding and a secondary winding rotatable relatively thereto, in which the voltage output of the secondary winding is proportional to the relative displacement between the primary and secondary windings. The torquing devices and servo motors are both illustrated as two phase induction motors having a constantly energized main field winding and a control field winding adapted for energization by a control signal. The torque at the output shaft of the torque motors is proportional to the strength of the control signal. It should be understood, however, that the particular pickoff element and the particular torquing means and motors illustrated in FIG. 2 are not to be considered limiting the invention in any way since any device capable of the desired operation can be substituted for the illustrated element without departing from the invention.

The main field windings of each of the torquing devices and the servo motors is shown as being connected to one phase, $\phi_1$, of a two phase constant alternating voltage power supply while the input windings of each of the pickoff devices is shown as being connected to the other phase, $\phi_2$, of the alternating voltage power supply. The control field windings of the torquing devices and motors are identified by the numeral corresponding to the device followed by the letter $a$. The output windings of the pickoff devices are identified similarly.

In the following description, the term "mean gyro position" is used. When applied to gyros 10, 20 in the vertical plane it denotes the position midway between gyros 10, 20. When applied to the gyros 30, 40 in the vertical plane it denotes the position midway between the spin axes of those gyros. However, when applied in azimuth, the mean gyro position of gyros 10, 20, 30 and 40 is that position displaced from a given reference position by an amount equal to the average of the total of the displacements of gyros 10, 20 from that reference position plus the displacements of the gyros 30, 40 from the perpendicular to that reference.

The inertial frame or platform 50 is adapted to be maintained in a known orientation with respect to the initial orientation as the craft on which the platform is mounted moves along its course. In FIG. 2 the electrical connections are such as to keep the mean gyro positions of the gyro pairs 10, 20 and 30, 40 horizontal and perpendicular to each other. These connections will be such as to cause the mean gyro positions to rotate in azimuth about their local vertical at a rate equal to the natural rate of rotation, which is the vertical component of the rotation of the platform about the earth's polar axis.

The pickoffs 17 and 27 are adapted to produce a null signal when the gyros 10 and 20 are aligned so as to have their spin axes in the plane of the frame 50 while the pickoffs 37 and 47 are adapted to produce a null signal when the gyros 30 and 40 are aligned so as to have their spin axes in a plane perpendicular to the plane of frame 50.

The outputs of the four pickoffs 17, 27, 37 and 47 are combined in the adding unit 70 to produce a signal proportional to one quarter of the sum of the individual pickoff outputs.

The output of the adding unit 70 is subtracted from each of the outputs of pickoffs 17, 27, 37 and 47 and the several differences are used to control the corresponding horizontal torque motor 18, 28, 38 or 48, respectively. Thus, winding 18a of motor 18 is energized jointly by pickoff winding 17a and the output of the adding unit 70, and if the energizing signal is not zero the gyro 10 is caused to precess toward the mean position in azimuth. Similarly, each of the torquing devices 28, 38 and 48 are energized jointly by the output of the adding unit 70 and the output of respective pickoffs 27, 37 and 47a to cause the respective gyros 20, 30 and 40 to precess towards the mean gyro position.

The control field winding 55a of motor 55 is also energized by the output of summing device 70. Thus, the motor 55 will drive the frame 50 until the outputs of the pickoffs 17, 27, 37 and 47 combine to produce a null signal, hence the frame 50 will be aligned with the mean position of gyros 10, 20, 30 and 40, in azimuth The output of pendulum pickoff 65 is electrically connected through the integrator 71 and scaling device 72 to the torquing devices 19 and 29 jointly with another signal derived from the pickoff devices 16 and 26 respectively. The integrator 71 and scaler 72 provide the well known Schuler tuning whereby the axes of the gyros 10, 20 are maintained horizontal at all times. Similarly, the pendulum pickoff 66 is connected through integrator 73 and scaling device 74 to the torquing devices 39 and 49 of gyros 20, 30 jointly with another signal derived from the pickoffs 36 and 46 respectively. The integrator 73 and scaler 74 provide the Schuler tuning of gyros 30, 40 whereby the axes of the gyros 30, 40 are maintained horizontal at all times.

The outputs of pickoffs 16 and 26 are averaged in the adding device 75 and the output of each pickoff 16 and 26 is subtracted severally from the output of the adding device 75 in the subtraction units 76 and 77 respectively.

If the outputs of the pickoff units 16 and 26 are $a$ and $b$ respectively, the output of the averaging device 75 is $$\frac{a+b}{2}$$

and the output of the subtraction unit 76 is $$\frac{a+b}{2}-a \text{ or } \frac{b-a}{2}$$

which is proportional to the difference between the outputs of pickoffs 26 and 16. Similarly, the output of the subtraction device 77 is seen to be $$\frac{a+b}{2}-b \text{ or } \frac{a-b}{2}$$

which is the negative of the output of subtraction device 76 or the difference between the outputs of pickoffs 16 and 26.

The signals from subtraction units 76, 77 are applied to the torque motors 19 and 29 respectively, jointly with the output of the integrator 72, and are effective to cause precession of the spin axes of gyros 10 and 20 to the positions where $a$ and $b$ are equal and the torque motors 19 and 20 are deenergized. Since the directions of rotation of the gyros 10 and 20 are opposite to each other, the torques applied to the gyros 10 and 20 by the torquing devices 19, 29 must be in opposite directions to produce precession of the gyros 10 and 20 in the same direction with respect to frame 50. The pickoffs 16, 26, therefore, are installed so that their outputs are equal and the same polarity for like displacements of the gyro spin axes, and the torquing devices 19, 29 are installed so that the direction of the applied torque corresponds to the sign of the signal applied to the control windings 19a and 20a.

In a similar fashion, the outputs of pickoffs 36 and 46 are averaged in the adding or averaging device 80, and are subtracted from the output of the averaging device 80 at 81 and 82 respectively to provide signals proportional to the positive and negative differences. The difference signals are applied to the respective torque motors 39 and 49, jointly with the output from integrator 74, in a manner such that the spin axes of gyros 30 and 40 will precess in the direction to reduce the difference between the displacements of the gyro spin axes and when the displacements become equal, the torque motors 39, 49 will be deenergized.

Displacements of the spin axes of gyros 10 and 20 from their reference position with respect to the frames 13 and 23 which occur in the same direction as viewed from the same position reflect a deviation of the support from the gyro reference. This situation requires that the gyro support be driven by the servo motors until the position of the support corresponds with that of the gyro.

For purposes of stabilization, therefore, the output of the summing device 75 is also applied to one primary winding 78 of the resolver 54, the other primary winding 79 of which is energized by the output of the summing device 80. The signals to the primary winding 79 is proportional to the average displacement of the frames 33, 43 from the positions of gyros 30, 40. The secondary winding 81 and 82 of resolver 54, which are displaced from the primary windings 78, 79 by shaft 51 are connected to energize the control windings 59a and 63a of servo motors 59 and 63 respectively. The motors 59 and 63 then drive the gimbal frames 53 and gimbal ring 58 in a direction to decrease their energizing voltage until the motors are deenergized, and the frames 13, 23, 33 and 43 are positioned according to the mean position of the appropriate gyros.

Any displacements of the spin axes of the gyros 10 and 20 from their reference position with respect to the frames 13 and 23 which occur in opposite directions as viewed from the same position result from error torques and are corrected by application of correcting torques to the gyroscopes.

The pickoffs 16 and 26 are installed in a manner such that their outputs are equal in sign and magnitude for equal displacements between the gyros 10, 20 and their frames 13, 23, and if gyro torquing devices 19, 29 are both energized by the algebraic difference between the signals the absolute torque to each of the gyros 10, 20 is in the same direction and since the gyros are spinning in opposite directions, the spin axes will precess toward each other to reduce the deviation.

With respect to frames 13, 23 and gyros 10, 20 it will be seen that if the gyro spin axes are displaced to the same side of the planes containing the axes 11, 12 and 21, 22 which are respectively perpendicular to frames 13, 23 by the same amount $a$, the imputs to the torque motors 19 and 29 will be zero $$\left(\text{since } \frac{a+a}{2}-a=0\right)$$

while the signal to primary winding 78 will be proportional to $a$. On the other hand if the spin axes are displaced to opposite sides by the same amount $a$, the imputs to the torque motor 19 and 29 will be $$\frac{a-a}{2}-a=a$$

and $$\frac{a-a}{2}+a=a$$

respectively while the signal to primary winding 78 will be zero $$\left(\frac{a-a}{2}\right)$$

It will be seen then that the gyros 10, 20 will be precessed by the torque motors 19, 29 until their displacement from the frames 13, 23 are equal, and the motors 59 and 63 will keep the frames 13, 23, oriented according to the mean positions of the gyros 10, 20. Similarly, the servo motors 59, 63 will keep the frames 33, 43 oriented according to the mean position of the gyros 30, 40.

Prior to navigational use the gyros 10, 20, 30, 40 and the frame 50 must be aligned in some known and desired position with respect to the earth's coordinates. For example, a particularly common alignment positions the three mutually perpendicular axes of the system along the horizontal north-south direction, the horizontal east-west direction, and the local vertical direction. For the present apparatus, this common orientation is used, so that the spin axes of gyros 10 and 20 are initially directed along the meridian in horizontal plane, the spin axes of gyros 30 and 40 are directed east-west and horizontally and the axis through shafts 51, 52 is directed vertically.

To effect this initial alignment, the electromechanical elements of FIG. 1 are electrically connected as shown in FIG. 3. In practice the circuitry of FIGS. 3 and 2 would be combined through certain switching means, but for clarity the two conditions, namely, the alignment and navigation modes, are shown in separate figures. Anyone skilled in the art, can provide the required switching which may generally follow the lines described in the copending U.S. patent application previously referred to.

With reference then to FIG. 3 of the drawings the outputs of the pickoff devices 17, 27 are added and the sum is applied to control the motor 55, which accordingly drives the frame 50 about the axis through its shafts 51 and 52 until the spin axes of gyros 10, 20 are in the plane of frame 50. In general, the spin axes of gyros 10, 20 are not exactly colinear or parallel and the frame 50 stabilizes at a position equally displaced from and situated between the spin axes of gyros 10 and 20.

The axes of gyros 30 and 40 are caused to become perpendicular to the plane of frame 50 through the action of pickoff devices 37, 47 and torque motors 38, 48 in which the torque motors 38, 48 are energized by the outputs of respective pickoffs 37, 47. The pickoff output is zero when the spin axes of the particular gyro is in a plane perpendicular to the plane of the frame 50. The torque motors 38, 48 apply torques to the gyros 30 and 40 to cause precession of the gyros 30 and 40 into a plane perpendicular to the frame 50. The pickoff devices 16, 26 and 36, 46 control the servo motors 59, 63 through resolver 54 as described earlier to drive the frame 50 about substantially horizontal axes until the spin axes of the gyros 10, 20, 30 and 40 are perpendicular to their respective gimbal frames 13, 23, 33 and 43.

Pendulum 65, is connected to the torque motors 18, 28 of gyros 10, 20 in a manner similar to that in a gyro compass whereby the gyros 10, 20 will be caused to precess in azimuth toward the meridian upon tilts of the spin axes of the gyros from the horizontal, while a signal proportional to the vertical component of the earth's rotation, $w_e \sin \lambda$, maintains the spin axes on the meridian. A portion of the pendulum output is applied to the vertical torque motors 19, 29 of the gyros 10, 20 to damp the motion of the gyros in azimuth.

Since the spin axes of gyros 30, 40 are aligned in the east-west direction upon alignment of the gyros 10, 20 into the meridian, the apparent tilt of the spin axes due to the motion of the earth must be compensated. The output of the pendulum pickoff 66 is integrated in the integrator 73, and the sum of the pendulum pickoff 66 output and the integrator 73 output are applied to the torque motors 39, 49 to apply torques to gyros 30, 40 about their vertical axes, which cause precession of the gyro spin axes into the horizontal.

When the output of the integrator 73 becomes proportional to the horizontal component of the earth's rotation $w_e \cos \lambda$, and the output of the pickoff device 66 becomes zero, the torque applied by motors 39, 49 is just sufficient to keep the spin axes of the gyros 30, 40 horizontal.

The output of integrator 71 is initially driven to zero by connecting the output thereof directly to the input in the well known manner.

It will be seen that in the steady state condition, the spin axes of gyros 10, 20 are directed toward the north and south and the spin axes of gyros 30, 40 are directed east and west, the shafts of frame 50 are directed vertically, the output of integrator 73 is $W_e \cos \lambda$ and the output of integrator 71 is zero.

Upon establishment of these conditions, the instrument is ready to assume the navigation mode, when required, simply by switching the connections from those shown in FIG. 3 to those shown in FIG. 2.

The instrument herein described represents a preferred embodiment of the invention, and it should be realized that a number of changes in the described instrument can be made without departing from the spirit of the invention. As an example the number of parallel gyros in any one direction need not be limited to two, the total number of gyros for the platform need not be limited to four and the number of gyros in parallel in one direction need not be the same as the number of parallel gyros in the perpendicular direction. The four gyros were chosen for the description merely as illustrative of a satisfactory and adequate system.

It is further contemplated that in the event of one gyro becoming inoperative for some reason, a logic device will be activated to discard the improper reading from the computer and to make suitable modifications in the computer. However, logic devices of this character are known and do not form part of the present invention so that no further description of this contemplated safety device will be made.

I claim:

1. In a device of the character described, a frame mounted on an unstable support, a plurality of gyroscopes having substantially parallel spin axes, said gyroscopes being mounted for universal rotation in said frame, pickoff means for detecting relative displacement between said gyroscopes and said frame, means for combining the outputs of said pickoff means to produce signals proportional to the sum and differences therebetween, torquing means for controlling said gyroscopes according to said differences and motive means for driving said frame with respect to said support according to said sum.

2. In a device of the character described, a frame mounted on an unstable support, a plurality of gyroscopes having substantially parallel spin axes, said gyroscopes being mounted for universal rotation in said frame, pickoff means for detecting relative displacement between said gyroscopes and said frame, means for combining the outputs of said pickoff means to produce signals proportional to the sum and differences therebetween, torquing means for controlling said gyroscopes according to said differences and motive means for driving said frame with respect to said support according to said sum, certain of said gyroscopes rotating in one direction and the remainder of said gyroscopes rotating in the opposite direction.

3. In a device of the character described, a frame mounted on an unstable support, a plurality of gyroscopes having substantially parallel spin axes, said gyroscopes being mounted for universal rotation in said frame, pickoff means for detecting relative displacement between said gyroscopes and said frame, means for combining the outputs of said pickoff means to produce signals proportional to the sum and differences therebetween, torquing means for controlling said gyroscopes according to said differences and motive means for driving said frame with respect to said support according to said sum, a second plurality of gyroscopes having substantially parallel spin axes perpendicular to the spin axes of the first set of gyroscopes, said second plurality of gyroscopes being mounted for universal rotation in said frame, second pickoff means for detecting relative displacement between said second gyroscopes and said frame, second means for combining the output of said second pickoff means to produce second signals proportional to the sum and differences therebetween and second torquing means for controlling said second gyroscopes according to said differences, said means for driving said frame with respect to said support also being responsive to said second sum.

4. In a device of the character described, a frame mounted on an unstable support, a plurality of gyroscopes having substantially parallel spin axes, said gyroscopes being mounted for universal rotation in said frame, pickoff means for detecting relative displacement between said gyroscopes and said frame, means for combining the outputs of said pickoff means to produce signals proportional to the sum and differences therebetween, torquing means for controlling said gyroscopes according to said differences and motive means for driving said frame with respect to said support according to said sum, a second plurality of gyroscopes having substantially parallel spin axes perpendicular to the spin axes of the first set of gyroscopes, said second plurality of gyroscopes being mounted for universal rotation in said frame, second pickoff means for detecting relative displacement between said second gyroscopes and said frame, second means for combining the output of said second pickoff means to produce second signals proportional to the sum and differences therebetween and second torquing means for controlling said second gyroscopes according to said differences, said means for driving said frame with respect to said support also being responsive to said second sum, some of the gyroscopes of each set rotating in opposite directions with respect to the rest of the gyroscopes of that set.

5. In a stable platform for moving vehicles, two sets of gyroscopes, each set including a plurality of gyroscopes having substantially parallel spin axes, each of said sets being adapted to control the platform severally about two of three mutually perpendicular axes, said platform being controlled about the third of said axes by all of said gyroscopes.

References Cited in the file of this patent
UNITED STATES PATENTS
1,947,562      Marmonier _____ Feb. 20, 1934